United States Patent
Iikura et al.

(10) Patent No.: US 8,789,044 B2
(45) Date of Patent: Jul. 22, 2014

(54) NETWORK SYSTEM, MANAGEMENT SERVER, AND VIRTUAL MACHINE DEPLOYMENT METHOD

(75) Inventors: Fumi Iikura, Kawasaki (JP); Yasuhide Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 390 days.

(21) Appl. No.: 13/113,642

(22) Filed: May 23, 2011

(65) Prior Publication Data

US 2011/0302580 A1    Dec. 8, 2011

(30) Foreign Application Priority Data

Jun. 4, 2010   (JP) .................................. 2010-129094

(51) Int. Cl.
 *G06F 9/455*   (2006.01)

(52) U.S. Cl.
 USPC .......................................................... 718/1

(58) Field of Classification Search
 None
 See application file for complete search history.

(56) References Cited

U.S. PATENT DOCUMENTS

| 8,209,415 | B2 * | 6/2012 | Wei | 709/224 |
| 8,250,215 | B2 * | 8/2012 | Stienhans et al. | 709/227 |
| 8,281,307 | B2 * | 10/2012 | Arnold et al. | 718/1 |
| 8,381,211 | B2 * | 2/2013 | Ashok et al. | 718/1 |
| 8,464,255 | B2 * | 6/2013 | Nathuji et al. | 718/1 |
| 2009/0133018 | A1 | 5/2009 | Kaneki | |
| 2010/0306355 | A1 * | 12/2010 | Lagergren et al. | 709/222 |
| 2010/0325191 | A1 * | 12/2010 | Jung et al. | 709/202 |

FOREIGN PATENT DOCUMENTS

| JP | 09-223092 A | 8/1997 |
| JP | 10-283210 | 10/1998 |
| JP | 2005-115653 A | 4/2005 |
| JP | 2009-123174 A | 6/2009 |
| JP | 2010-117760 | 5/2010 |

OTHER PUBLICATIONS

Japanese Office Action mailed Feb. 4, 2014 for corresponding Japanese Application No. 2010-129094, with partial English-language translation.

* cited by examiner

*Primary Examiner* — Van Nguyen

(74) *Attorney, Agent, or Firm* — Fujitsu Patent Center

(57) ABSTRACT

A network system includes a plurality of cloud systems. Each of the plurality of cloud systems includes a plurality of servers. Each of the plurality of servers allows virtual machines to run thereon. A first cloud system of the plurality of cloud systems includes a first generator and a deployer. The first generator generates, on the basis of first performance information regarding one virtual machine and a first predetermined coefficient predetermined for the first cloud system, second performance information regarding the one virtual machine. The first performance information is included in a first augmented image of the one virtual machine. The first augmented image is created in a second cloud system other than the first cloud system. The deployer deploys the one virtual machine on one of the plurality of servers included in the first cloud system on the basis of the generated second performance information.

18 Claims, 12 Drawing Sheets

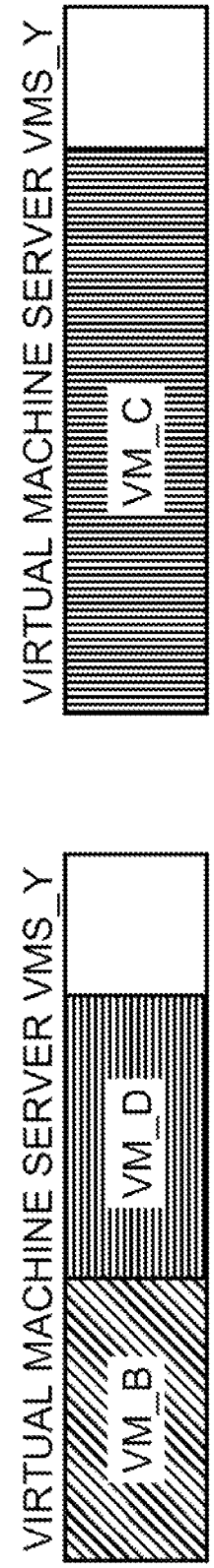
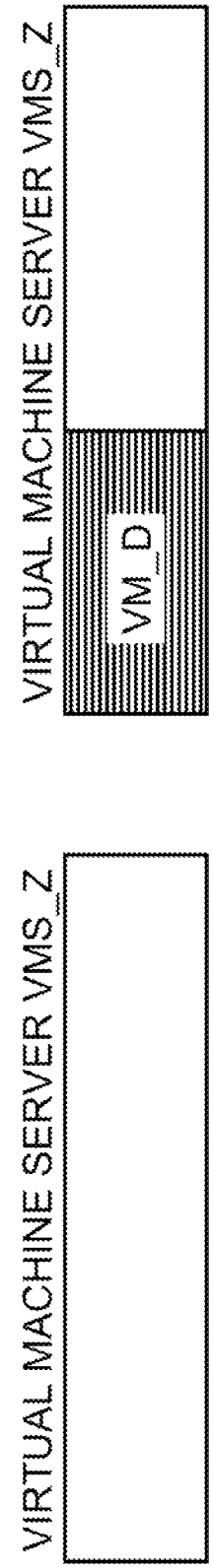
FIG. 3A
FIG. 3B
FIG. 3C

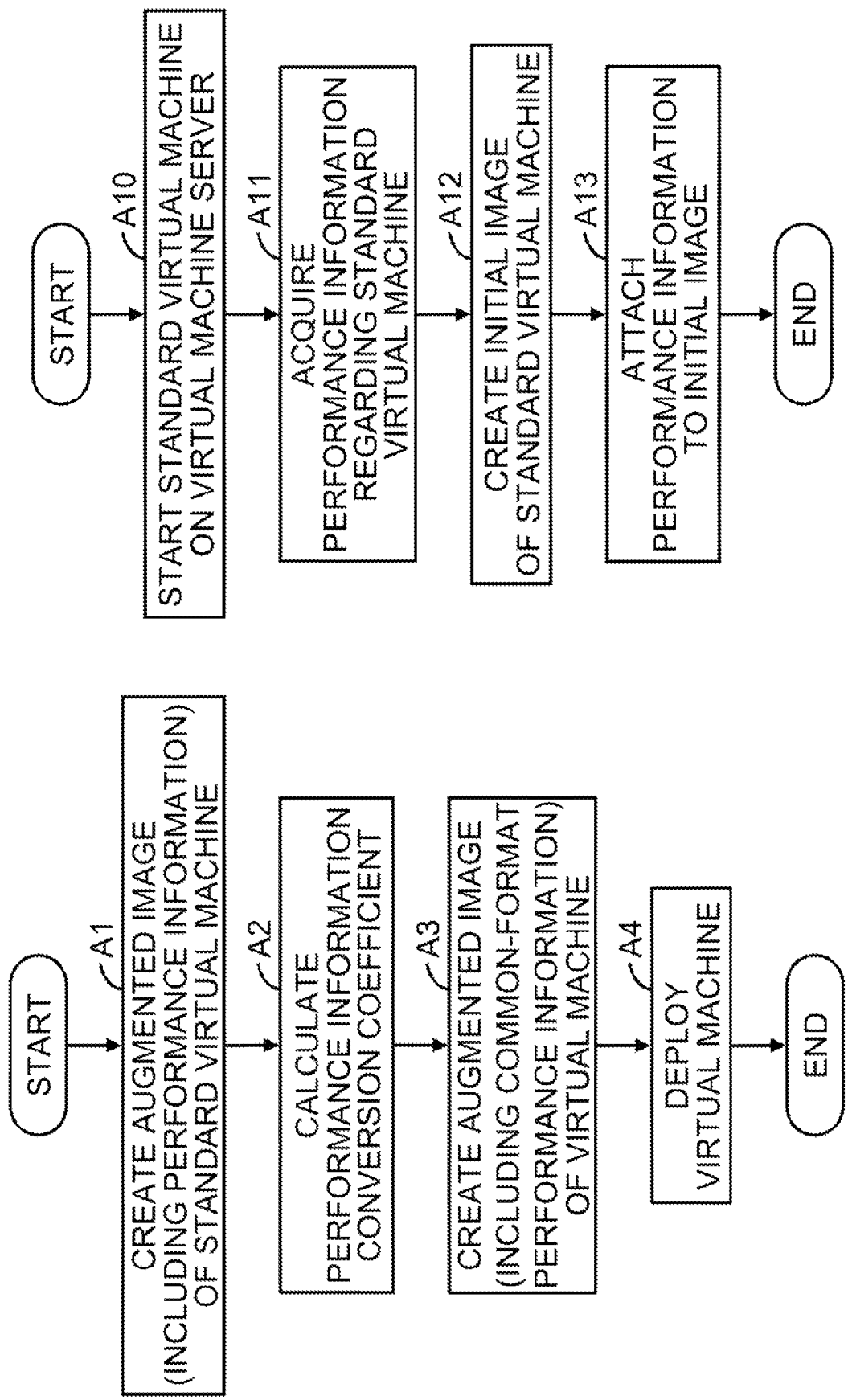

| VIRTUAL MACHINE | VM_A | VM_B | VM_C | VM_D | VM_E | VM_F |
|---|---|---|---|---|---|---|
| CPU UTILIZATION | 15% | 30% | 60% | 30% | 30% | 30% |
| HIGH LOADED TIME PERIOD | CONSTANT | MORNING | CONSTANT | NIGHT | MORNING | NIGHT |

| VIRTUAL MACHINE | TIME PERIOD | | | | | |
|---|---|---|---|---|---|---|
| | 0 - 2 | 2 - 4 | 4 - 6 | 6 - 8 | 8 - 10 | 10 - 12 |
| VM_A | 1 | 0 | 0 | 4 | 20 | 90 |
| VM_B | 0 | 0 | 0 | 1 | 10 | 150 |
| VM_C | 135 | 95 | 30 | 1 | 3 | 3 |
| VM_D | 70 | 105 | 40 | 1 | 1 | 2 |

| VIRTUAL MACHINE | TIME PERIOD | | | | | |
|---|---|---|---|---|---|---|
| | 12 - 14 | 14 - 16 | 16 - 18 | 18 - 20 | 20 - 22 | 22 - 24 |
| VM_A | 80 | 100 | 80 | 40 | 2 | 1 |
| VM_B | 50 | 130 | 30 | 2 | 0 | 0 |
| VM_C | 5 | 5 | 10 | 15 | 85 | 120 |
| VM_D | 4 | 6 | 30 | 45 | 50 | 60 |

FIG. 14

NETWORK SYSTEM, MANAGEMENT SERVER, AND VIRTUAL MACHINE DEPLOYMENT METHOD

CROSS-REFERENCE TO RELATED APPLICATION

This application is based upon and claims the benefit of priority of the prior Japanese Patent Application No. 2010-129094 filed on Jun. 4, 2010, the entire contents of which are incorporated herein by reference.

FIELD

The embodiments discussed herein are related to a method for deploying a virtual machine.

BACKGROUND

Techniques for efficiently executing a plurality of virtual machines on a plurality of servers have been proposed. For example, a virtual machine management server reads measured data indicating performance of each of the virtual machines in each of predetermined time periods, data on storage capacities of the servers allowing the virtual machines to run thereon, and data on storage capacities of the virtual machines from a database (DB). The virtual machine management server calculates, on the basis of the read data, performance of each of the virtual machines in each of the predetermined time periods when run on each of the servers. The virtual machine management server determines a combination of the virtual machines and the servers which provides the maximum sum of values indicating performance of the virtual machines in each of the predetermined time periods. The virtual machine management server stores an image file (also referred to as an image) of each of the virtual machines in a storage region of the server corresponding to the each of the virtual machines to redeploy the virtual machines in accordance with the determined combination.

Japanese Laid-open Patent Publication No. 2005-115653 discloses a related technique.

SUMMARY

According to an aspect of the present invention, provided is a network system including a plurality of cloud systems. Each of the plurality of cloud systems includes a plurality of servers. Each of the plurality of servers allows virtual machines to run thereon. A first cloud system of the plurality of cloud systems includes a first generator and a deployer. The first generator generates, on the basis of first performance information regarding one virtual machine and a first predetermined coefficient predetermined for the first cloud system, second performance information regarding the one virtual machine. The first performance information is included in a first augmented image of the one virtual machine. The first augmented image is created in a second cloud system other than the first cloud system. The second cloud system is included in the plurality of cloud systems. The deployer deploys the one virtual machine on one of the plurality of servers included in the first cloud system on the basis of the generated second performance information.

The object and advantages of the invention will be realized and attained by means of the elements and combinations particularly pointed out in the claims. It is to be understood that both the foregoing general discussion and the following detailed discussion are exemplary and explanatory and are not restrictive of the invention, as claimed.

BRIEF DESCRIPTION OF DRAWINGS

FIG. 3A is a diagram illustrating an example of performance information regarding virtual machines according to an embodiment of the present invention;

FIG. 3B is a diagram illustrating an exemplary deployment of virtual machines on virtual machine servers according to an embodiment of the present invention;

FIG. 3C is a diagram illustrating an exemplary deployment of virtual machines on virtual machine servers according to an embodiment of the present invention;

FIG. 5 is a diagram illustrating an exemplary operation flow of a virtual machine management server according to an embodiment of the present invention;

FIG. 6 is a diagram illustrating an exemplary operation flow of creating an augmented standard virtual machine image including standard performance information according to an embodiment of the present invention;

FIG. 14 is a diagram illustrating an example of load information according to an embodiment of the present invention.

DESCRIPTION OF EMBODIMENTS

How to deploy virtual machines efficiently across a plurality of cloud systems is not considered in existing techniques.

In addition, cloud systems do not have the same performance and configuration in general. Thus, efficient deployment may not be performed when a user tries to migrate a virtual machine running in a certain cloud system, since reliable information may not be acquired for deploying the virtual machine efficiently in a destination cloud system. In addition, it is not uncertain whether the performance of the virtual machine in the destination cloud system satisfies user's expectation, since reliable information may not be acquired for deploying the virtual machine efficiently.

It is preferable that virtual machines are efficiently deployed across different cloud systems.

Embodiments of a network system, a management server and a virtual machine deployment method will be discussed with reference to the accompanying drawings.

First Embodiment

Figure 1:
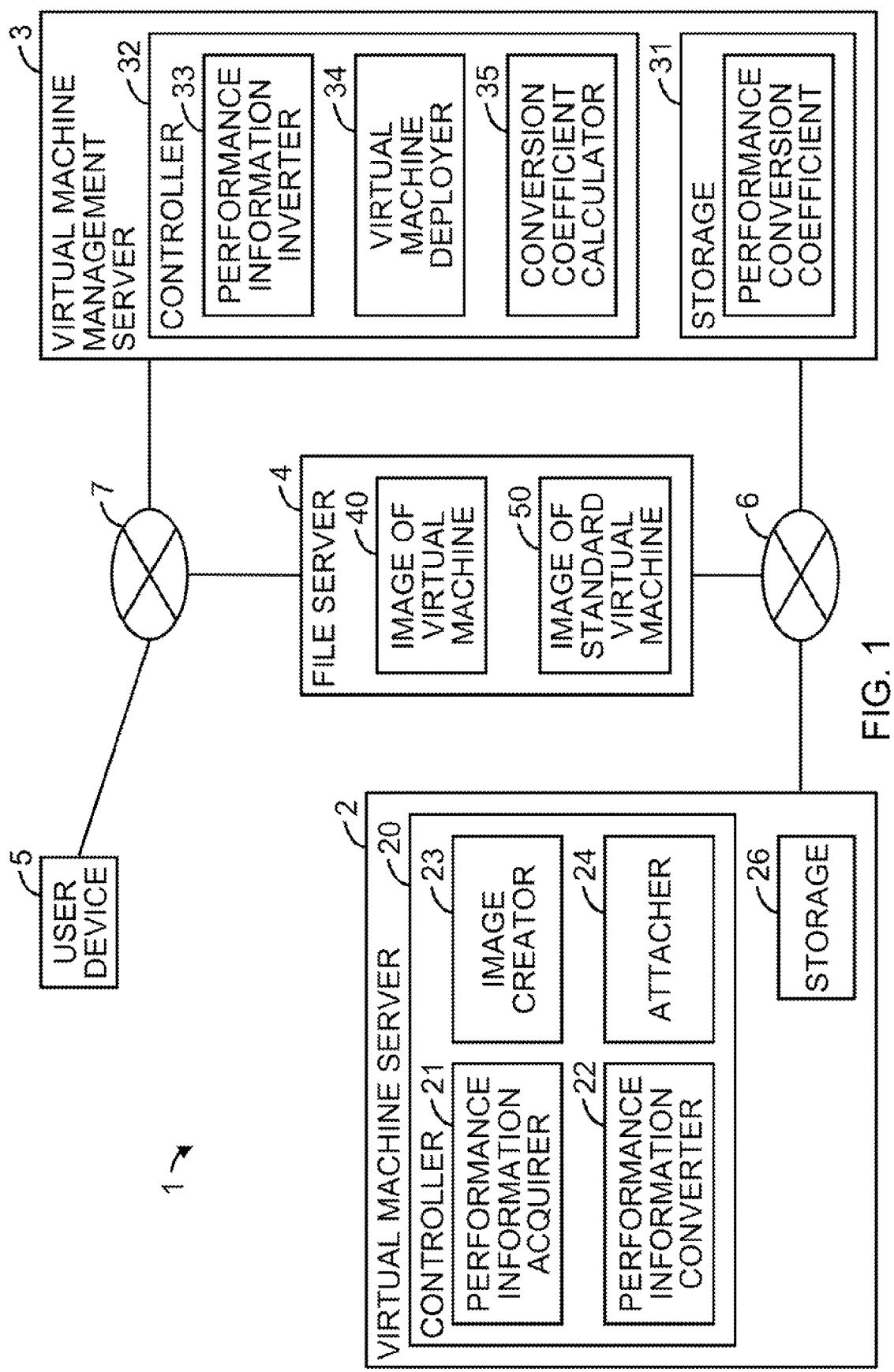
FIG. 1 is a diagram illustrating an exemplary configuration of a system according to an embodiment of the present invention.

FIG. 1 illustrates an exemplary configuration of a system according to a first embodiment. A system 1 illustrated in FIG. 1 includes a virtual machine server 2, a virtual machine management server 3 and a file server 4. The virtual machine server 2, the virtual machine management server 3 and the file server 4 are communicably connected to each other through a local area network (LAN) 6. In addition, a user device 5 is communicably connected to the virtual machine management server 3 and the file server 4 through the Internet 7 or the like. The system 1 is, for example, a cloud system that provides a predefined cloud service to the user device 5.

The user device 5 is, for example, a personal computer (PC). The user device 5 includes a central processing unit (CPU) and a storage device such as a read only memory (ROM), a random access memory (RAM), or a hard disk drive (HDD).

The file server 4 includes a CPU and a storage device such as an HDD, for example. The file server 4 is a server that stores an image (a file acquired by converting contents of a file system or the like) 40 of a virtual machine and an image 50 of a standard virtual machine (discussed later). Hereinafter, images of a virtual machine and a standard virtual machine may be referred to as a virtual machine image and a standard virtual machine image, respectively. The CPU of the file server 4 may transmit, in response to an instruction provided by the virtual machine management server 3, the virtual machine image held by the file server 4 to the virtual machine server 2 specified by the virtual machine management server 3.

Figure 2B:
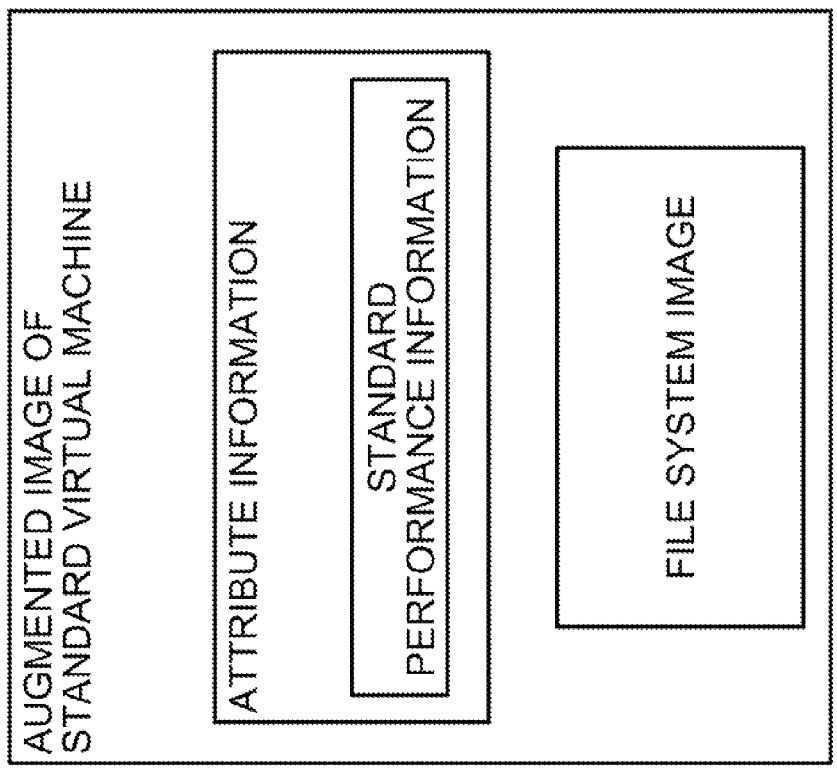
FIG. 2B is a diagram illustrating an exemplary image of a standard virtual machine according to an embodiment of the present invention.
Figure 2A:
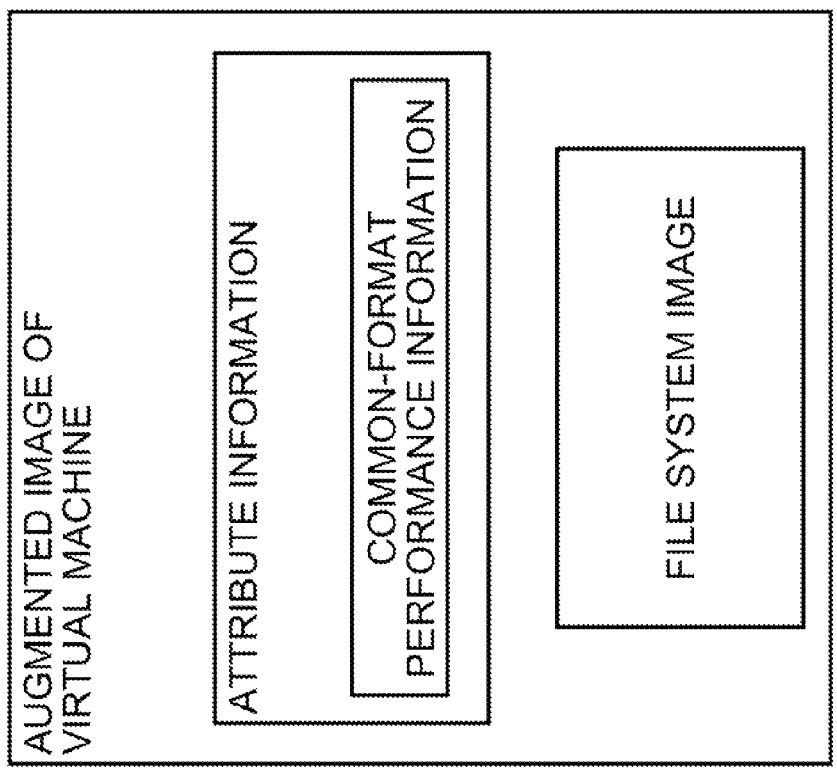
FIG. 2A is a diagram illustrating an exemplary image of a virtual machine according to an embodiment of the present invention.

FIG. 2A illustrates an example of the virtual machine image 40. FIG. 2B illustrates an example of the standard virtual machine image 50.

The standard virtual machine is a virtual machine that performs a benchmark test in the system. A performance information conversion coefficient (discussed later) is calculated on the basis of performance information, which may be referred to as standard performance information (discussed later), acquired by starting the standard virtual machine. In other words, the standard virtual machine is a virtual machine that is used to acquire information that is necessary to calculate the performance information conversion coefficient.

For example, each of the virtual machine image 40 and the standard virtual machine image 50 includes attribute information and a file system image.

The attribute information includes information such as an identifier (ID) of the virtual machine and version information of a kernel. In the present embodiment, the attribute information of the virtual machine image 40 includes common-format performance information created by a performance information converter 22 discussed later, and the attribute information of the standard virtual machine image 50 include standard performance information acquired by a performance information acquirer 21 discussed later.

The file system image includes binary files, library files or the like of an operating system (OS) such as Linux (registered trademark).

The file system images and the attribute information other than the common-format performance information or the standard performance information are the same as or similar to a file system image and attribute information that are included in a known virtual machine image, and a detailed discussion thereof is omitted.

The virtual machine server 2 is a server that allows virtual machines to run thereon, and an example of the virtual machine server 2 is a physical machine (a physical server). The virtual machine server 2 (physical machine) includes a controller 20 and a storage 26, for example.

The controller 20 is a CPU, for example. The controller 20 performs various types of calculations and control by executing various application programs stored in the storage 26 and thereby serves as a control processing device that achieves various functions.

The storage 26 is a memory such as an ROM or RAM, or an HDD. For example, the storage 26 stores the various application programs and a host OS that is Linux.

The virtual machine server 2 that is a physical machine is divided to achieve a virtual machine by causing the controller 20 that is the CPU to execute a virtual machine control program on the host OS. Virtual machines may be achieved by using various known methods, and a detailed discussion thereof is omitted.

In the virtual machine server 2, the controller 20 that is the CPU included in the physical machine achieves functions of the performance information acquirer 21, the performance information converter 22, an image creator 23 and an attacher 24 by executing the application programs and the like stored in the storage 26.

The performance information acquirer 21 acquires, in response to an instruction that has been transmitted from the virtual machine management server 3 in accordance with an instruction from the user device 5, one or more pieces of performance information regarding the virtual machine or the standard virtual machine running on the virtual machine server 2. For example, the performance information acquirer 21 acquires performance information from an OS (referred to as a guest OS) executed by the virtual machine or the standard virtual machine.

The performance information is information that indicates performance of the virtual machine that runs on a certain system. For example, the performance information is information that depends on a hardware configuration of the system. For example, CPU utilization, disk input/output (I/O) bandwidth utilization, memory usage, network I/O bandwidth utilization, a CPU cycle at the time of measurement of the performance information, the number of CPU cores and the like may be used as the performance information. The performance information may be an average or peak value of any of these types of information per unit time, or may be a periodical change in the information for each day or month as long as the performance information is used to deploy the virtual machine.

The performance information acquirer 21 may acquire one or more pieces of performance information regarding the virtual machine or the standard virtual machine running on the virtual machine server 2 upon starting the virtual machine or the standard virtual machine. The acquired performance information is transmitted to the virtual machine management server 3 and managed by the virtual machine management server 3 for each of the virtual machines.

The function of the performance information acquirer 21 may be achieved by various known methods, and a discussion thereof is omitted.

The performance information converter 22 converts the performance information acquired by the performance information acquirer 21 on the basis of a performance information conversion coefficient to generate common-format performance information. Specifically, the performance information converter 22 converts the performance information acquired by the performance information acquirer 21 by dividing the performance information by the performance information conversion coefficient, for example. The converted performance information is also referred to as the common-format performance information. The performance information conversion coefficient is a coefficient calculated by a conversion coefficient calculator 35 (discussed later). The performance information conversion coefficient is, for example, a CPU utilization coefficient, a disk I/O bandwidth utilization coefficient, a memory usage coefficient, or a network I/O bandwidth utilization coefficient, each normalized by a CPU cycle. The common-format performance information is, for example, CPU utilization, disk I/O bandwidth utilization, memory usage, or network I/O bandwidth utilization, each normalized by a CPU cycle.

As discussed above, the performance information converter 22 converts the performance information acquired by the performance information acquirer 21 on the basis of the performance information conversion coefficient to generate the common-format performance information.

When the performance information acquirer 21 acquires plural pieces of performance information, the performance information converter 22 converts the acquired plural pieces of performance information on the basis of a plurality of performance information conversion coefficients respectively corresponding to the plural pieces of performance information. For example, when the performance information acquirer 21 acquires the disk I/O bandwidth utilization and the memory usage as the plural pieces of performance information, the performance information converter 22 converts the plural pieces of performance information by dividing the disk I/O bandwidth utilization and the memory usage by the disk I/O bandwidth utilization coefficient and the memory usage coefficient, respectively.

The image creator 23 creates an image of the virtual machine or the standard virtual machine running on the virtual machine server 2, for example. The image creator 23 stores the created image of the virtual machine or the standard virtual machine in the file server 4. The function of the image creator 23 may be achieved by various known methods, and a discussion thereof is omitted.

The attacher 24 attaches the common-format performance information generated by the performance information converter 22 to the virtual machine image created by the image creator 23, for example. Specifically, the attacher 24 attaches the common-format performance information in the attribute information of the virtual machine image.

The attached common-format performance information is the CPU utilization, the disk I/O bandwidth utilization, the memory usage, or the network I/O bandwidth utilization, each normalized by the CPU cycle, for example. Information, such as the number of CPU cores, necessary for a deployment of the virtual machine may be attached to the virtual machine image as the common-format performance information even if the value may not be changed when a cloud system is changed.

The virtual machine management server 3 is a server that manages the virtual machine server 2 and the file server 4, for example. The virtual machine management server 3 includes a storage 31 and a controller 32 as illustrated in FIG. 1.

The storage 31 is a memory such as an ROM or an RAM or an HDD and stores the performance information conversion coefficient (discussed later) and various types of data such as application programs.

The various types of data are information regarding the virtual machine server 2, information regarding the file server 4, information regarding virtual machines running on the virtual machine server 2, information regarding virtual machine images, and information regarding the performance of the virtual machines.

The controller 32 is a CPU, for example. The controller 32 achieves functions of a performance information inverter 33, a virtual machine deployer 34 and a conversion coefficient calculator 35 by executing the application program and the like stored in the storage 31.

The performance information inverter 33 converts the common-format performance information included in the virtual machine image on the basis of the performance information conversion coefficient calculated by the conversion coefficient calculator 35 (discussed later) and stored in the storage 31, for example. Specifically, the performance information inverter 33 converts the common-format performance information included in the virtual machine image by multiplying the common-format performance information by the performance information conversion coefficient to generate information that is used by the virtual machine deployer 34 in deploying the virtual machine. The conversion of common-format performance information by the performance information inverter 33 is hereinafter also referred to as inversion in order to distinguish from the conversion of the performance information (acquired by the performance information acquirer 21) by the performance information converter 22.

When the virtual machine image has plural pieces of common-format performance information, the performance information inverter 33 performs inversion on the plural pieces of common-format performance information on the basis of performance information conversion coefficients corresponding to the plural pieces of common-format performance information, respectively. The performance information inverter 33 converts, for example, the disk I/O bandwidth utilization and the memory usage (that are the plural pieces of the common-format performance information) on the basis of the disk I/O bandwidth utilization coefficient and the memory usage coefficient, respectively.

The virtual machine deployer 34 deploys the virtual machine or the standard virtual machine on the virtual machine server 2, for example. In this case, the deployment is to copy the image of the virtual machine or the standard virtual machine into the storage 26 included in the virtual machine server 2. Specifically, the virtual machine deployer 34 deploys the virtual machine image on the virtual machine server 2 on the basis of one or more pieces of performance information converted by the performance information inverter 33 and causes the virtual machine server 2 to start the virtual machine. The virtual machine deployer 34 may deploy the virtual machine image by instructing the file server 4 to transmit the virtual machine image to the virtual machine server 2. The virtual machine deployer 34 may acquire the virtual machine image from the file server 4 to deploy the virtual machine image in the virtual machine server 2.

The virtual machine deployer 34 deploys a virtual machine image without performance information or a standard virtual machine image without performance information so that a corresponding virtual machine or standard virtual machine may run on an appropriate virtual machine server 2 determined by an initial setting, for example. Hereinafter, an image without performance information may be referred to as an initial image. An initial image of a virtual machine may be referred to as an initial virtual machine image. An initial image of a standard virtual machine may be referred to as an initial standard virtual machine image.

FIG. 3A illustrates an example of performance information regarding virtual machines. FIG. 3B illustrates an exemplary deployment of the virtual machines on the virtual machine servers. FIG. 3C illustrates another exemplary deployment of the virtual machines on the virtual machine servers. An example of operations of the virtual machine deployer 34 will be discussed with reference to FIGS. 3A to 3C.

FIGS. 3A to 3C illustrate a system that includes three virtual machine servers VMS_X, VMS_Y and VMS_Z and four virtual machines (virtual machine images) VM_A, VM_B, VM_C and VM_D. As illustrated in FIG. 3A, the CPU utilization normalized by the CPU cycle is provided for each of the virtual machines VM_A to VM_D as the performance information inverted by the performance information inverter 33. In the example illustrated in FIG. 3A, the CPU utilization normalized by the CPU cycle of the virtual machines VM_A to VM_D are 20%, 40%, 80% and 40%, respectively.

For example, in order to deploy the virtual machines for the purpose of saving energy of the virtual machine servers as much as possible, it is preferable that the virtual machines be deployed so that at least one of the virtual machine servers does not include any virtual machine as illustrated in FIG. 3B as an example. Specifically, the virtual machine deployer 34 of the virtual machine management server 3 deploys the virtual machines VM_A and VM_C on the virtual machine server VMS_X, the virtual machines VM_B and VM_D on the virtual machine server VMS_Y, and no virtual machine on the virtual machine server VMS_Z.

With this deployment, a single virtual machine server (for example, virtual machine server VMS_Z) may be turned off, and whereby energy may be saved.

In the present example, the virtual machine deployer 34 deploys the virtual machines for the purpose of saving energy. However, the present embodiment is not limited to this example. For example, the virtual machine deployer 34 may deploy the virtual machines VM_A to VM_D on the virtual machine servers VMS_X to VMS_Y so that the CPU utilizations are equal to each other or close to each other as much as possible.

Specifically, at least one of the virtual machines VM_A to VM_D may be deployed in each of all the virtual machine servers VMS_X to VMS_Z as illustrated in FIG. 3C so that loads of the virtual machine servers may be distributed and processing may be performed at a higher speed.

As discussed above, the virtual machine deployer 34 deploys the virtual machines on the virtual machine servers on the basis of the performance information inverted by the performance information inverter 33.

The function of the virtual machine deployer 34 may not be limited to the aforementioned function. The function of the virtual machine deployer 34 may be achieved by various known methods, and a detailed discussion thereof is omitted.

The conversion coefficient calculator 35 calculates a performance information conversion coefficient. Specifically, the conversion coefficient calculator 35 calculates one or more performance information conversion coefficients by dividing one or more pieces of performance information (acquired by the performance information acquirer 21) regarding the virtual machine running on the virtual machine server 2 by corresponding one or more pieces of standard performance information included in the standard virtual machine image in advance, respectively.

As discussed above, the CPU utilization coefficient, the disk I/O bandwidth utilization coefficient, the memory usage coefficient, and the network I/O bandwidth utilization coefficient, each normalized by the CPU cycle, may be used as the performance information conversion coefficient. A performance information conversion coefficient is not necessary for the information, such as the number of CPU cores, attached to the virtual machine image as the common-format performance information even if the value may not be changed when a cloud system is changed.

Figure 4:
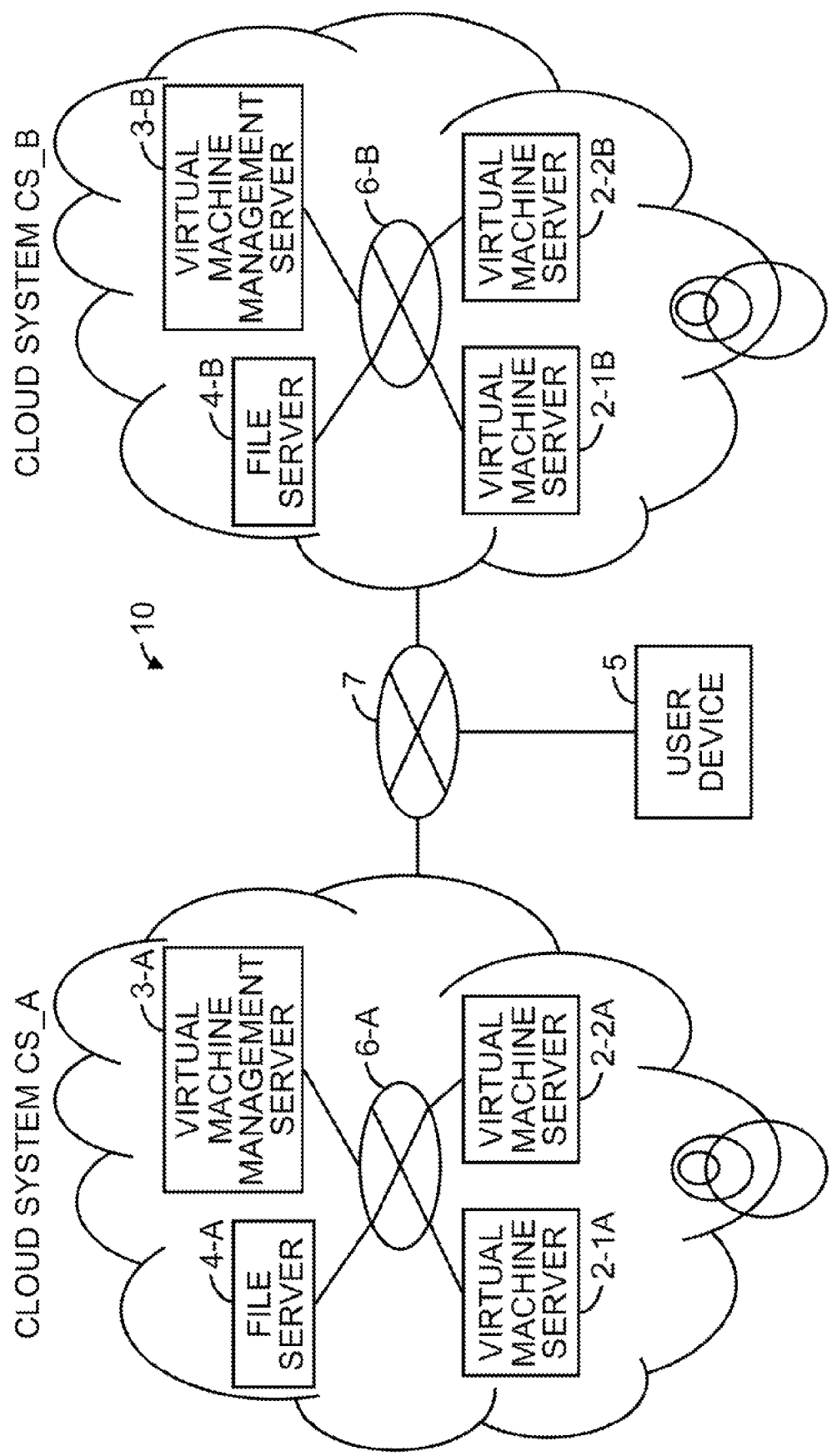
FIG. 4 is a diagram illustrating an exemplary configuration of a network system according to an embodiment of the present invention.

FIG. 4 is a diagram illustrating an exemplary configuration of a network system according to an embodiment of the present invention. The network system according to the present embodiment includes a plurality of systems each of which has the configuration discussed above. The network system 10 illustrated in FIG. 4 includes a cloud system CS_A and a cloud system CS_B. The cloud system CS_A and the cloud system CS_B are communicably connected to each other through the Internet 7. The user device 5 is communicably connected to the cloud system CS_A and the cloud system CS_B through the Internet 7.

The cloud system CS_A includes virtual machine servers 2-1A and 2-2A, a virtual machine management server 3-A and a file server 4-A. In the cloud system CS_A, the virtual machine servers 2-1A and 2-2A, the virtual machine management server 3-A and the file server 4-A are communicably connected to each other through a LAN 6-A.

The cloud system CS_B includes virtual machine servers 2-1B and 2-2B, a virtual machine management server 3-B and a file server 4-B. In the cloud system CS_B, the virtual machine servers 2-1B and 2-2B, the virtual machine management server 3-B and the file server 4-B are communicably connected to each other through a LAN 6-B.

In the following discussion, a specific virtual machine server may be specified as the virtual machine server 2-1A, the virtual machine server 2-2A, the virtual machine server 2-1B, or the virtual machine server 2-2B, and any one of the virtual machine servers may be specified as the virtual machine server 2.

Any one of the virtual machine servers included in each of the cloud systems may be specified as the virtual machine server 2-A or the virtual machine server 2-B.

A specific virtual machine management server may be specified as the virtual machine management server 3-A or the virtual machine management server 3-B, and any one of the virtual machine management servers may be specified as the virtual machine management server 3.

A specific file server may be specified as the file server 4-A or the file server 4-B, and any one of the file servers may be specified as the file server 4.

FIG. 5 illustrates an exemplary operation flow of the virtual machine management server according to the present embodiment. The operation flow of a method for deploying virtual machines in the network system 10 according to the present embodiment will be discussed with reference to FIG. 5.

In A1, a standard virtual machine image including standard performance information is created. Hereinafter, an image including performance information may be referred to as an augmented image. An augmented image including common-format performance information of a virtual machine may be referred to as an augmented virtual machine image. An augmented image including standard performance information of a standard virtual machine may be referred to as an augmented standard virtual machine image or a standard augmented image. First, a virtual machine management server 3 included in any of the cloud systems is arbitrarily chosen to create an initial standard virtual machine image. Since an initial image does not include performance information, performance information is attached to the initial standard virtual machine image to create the augmented standard virtual machine image.

In A2, in each of the cloud systems, the virtual machine management server 3 calculates and stores a performance information conversion coefficient for the each of the cloud systems on the basis of the augmented standard virtual machine image.

In A3, to allow a virtual machine to be deployed across different cloud systems, the virtual machine management server 3 included in the each of the cloud systems calculates common-format performance information for the virtual machine on the basis of the performance information conversion coefficient and creates an augmented virtual machine image including the common-format performance information.

In A4, the virtual machine is deployed across the cloud systems on the basis of the common-format performance information regarding the virtual machine and the performance information conversion coefficients for the destination cloud system.

FIG. 6 illustrates an exemplary operation flow of creating an augmented standard virtual machine image including standard performance information according to the present embodiment. The details of A1 in FIG. 5, i.e., the operation flow of creating an augmented standard virtual machine image will be discussed with reference to FIG. 6.

In A10, a user uploads from the user device 5 connected to the Internet an original initial image stored in an internal or external storage device of the user device 5 into a file server (the file server 4-A in this case) included in an arbitrarily chosen cloud system (cloud system CS_A in this case) to start a standard virtual machine. In addition to the uploading, the user instructs from the user device 5 a virtual machine management server (the virtual machine management server 3-A in this case) to execute the uploaded original initial image. In response to the instruction, the virtual machine deployer 34 of the virtual machine management server 3-A acquires the specified original initial image from the file server 4-A and deploys the acquired original initial image on the virtual machine server 2-A to instruct the virtual machine server 2-A to start a corresponding virtual machine as the standard virtual machine. Thus, the standard virtual machine is started (activated) on the virtual machine server 2-A.

In A11, for example, when the standard virtual machine is started on the virtual machine server 2-A, the performance information acquirer 21 acquires performance information regarding the standard virtual machine in response to an instruction transmitted from the virtual machine management server 3-A in accordance with an instruction from the user device 5.

In A12, for example, the image creator 23 of the virtual machine server 2-A creates an initial image of the standard virtual machine which runs on the virtual machine server 2-A in response to an instruction to create a standard virtual machine image, which has been transmitted from the user device 5 via the virtual machine management server 3-A. The image creator 23 of the virtual machine server 2-A may create an initial image of the standard virtual machine which runs on the virtual machine server 2-A, at a predetermined time, e.g., when the virtual machine is shut down.

In A13, the attacher 24 attaches the performance information acquired by the performance information acquirer 21 to the attribute information of the initial standard virtual machine image created by the image creator 23, and the augmented standard virtual machine image including the standard performance information is stored in the file server 4-A. The performance information converter 22 does nothing about the standard virtual machine. The augmented standard virtual machine image including the standard performance information is read from the file server 4-A and stored in the internal or external storage device of the user device 5 in response to an instruction from the user device 5.

Figure 7:
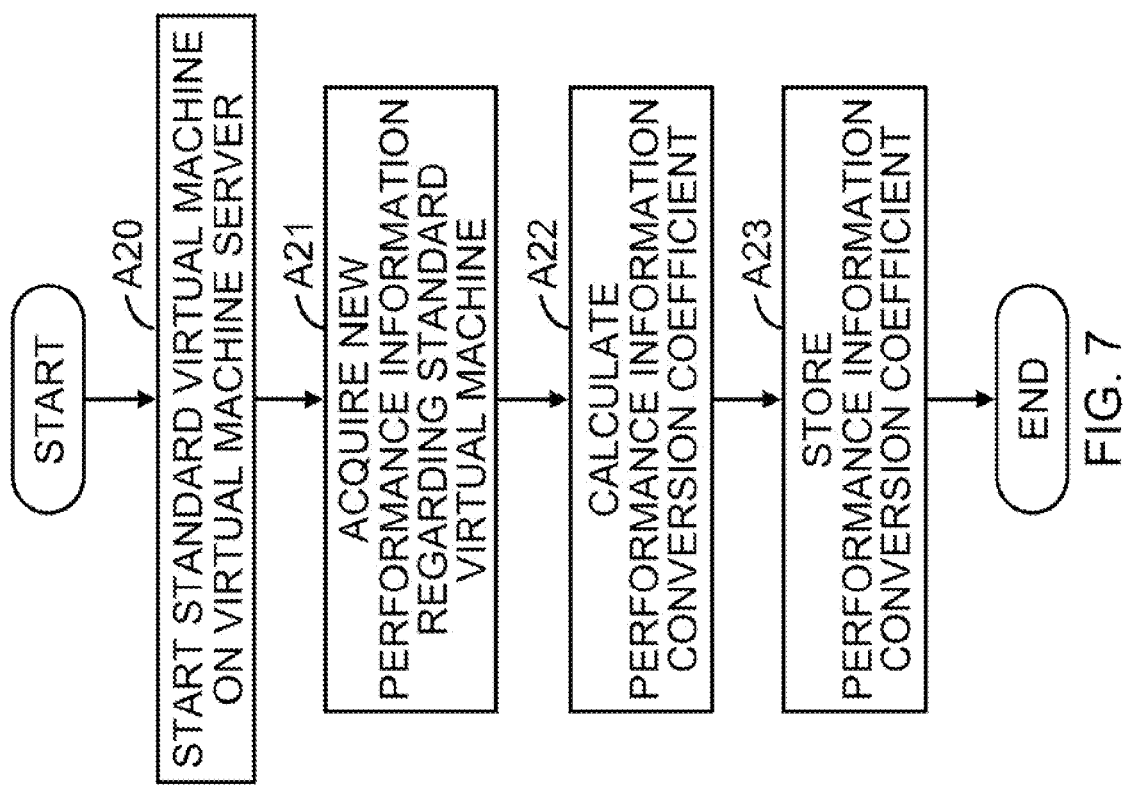
FIG. 7 is a diagram illustrating an exemplary operation flow of calculating a performance information conversion coefficient according to an embodiment of the present invention.

FIG. 7 illustrates an exemplary operation flow of calculating a performance information conversion coefficient according to the present embodiment. The details of A2 in FIG. 5, i.e., the operation flow of calculating a performance information conversion coefficient will be discussed with reference to FIG. 7.

In A20, the user uploads from the user device 5 the augmented standard virtual machine image including the standard performance information stored in the internal or external storage device of the user device 5 into the file server 4-B included in a certain cloud system (the cloud system CS_B in this case). In addition to the uploading, the user instructs from the user device 5 the virtual machine management server 3-B, which is included in the cloud system including the file server 4-B in which the augmented standard virtual machine image has been uploaded, to execute the augmented standard virtual machine image. Thus, the standard virtual machine is started on the virtual machine server 2-B. When the virtual machine management server 3-B instructs the file server 4-B to transmit the augmented standard virtual machine image, the virtual machine management server 3-B acquires the standard performance information included in the augmented standard virtual machine image stored in the file server 4-B.

In A21, when the standard virtual machine is running on the virtual machine server 2-B, the performance information acquirer 21 acquires new performance information regarding the standard virtual machine in response to an instruction transmitted from the virtual machine management server 3-B in accordance with an instruction from the user device 5.

In A22, the virtual machine management server 3-B receives the new performance information acquired in A21 from the performance information acquirer 21. The conversion coefficient calculator 35 calculates a performance information conversion coefficient on the basis of the new performance information acquired in A21 and the standard performance information included in the augmented standard virtual machine image.

In A23, the calculated performance information conversion coefficient is stored in the virtual machine management server 3-B.

Figure 8:
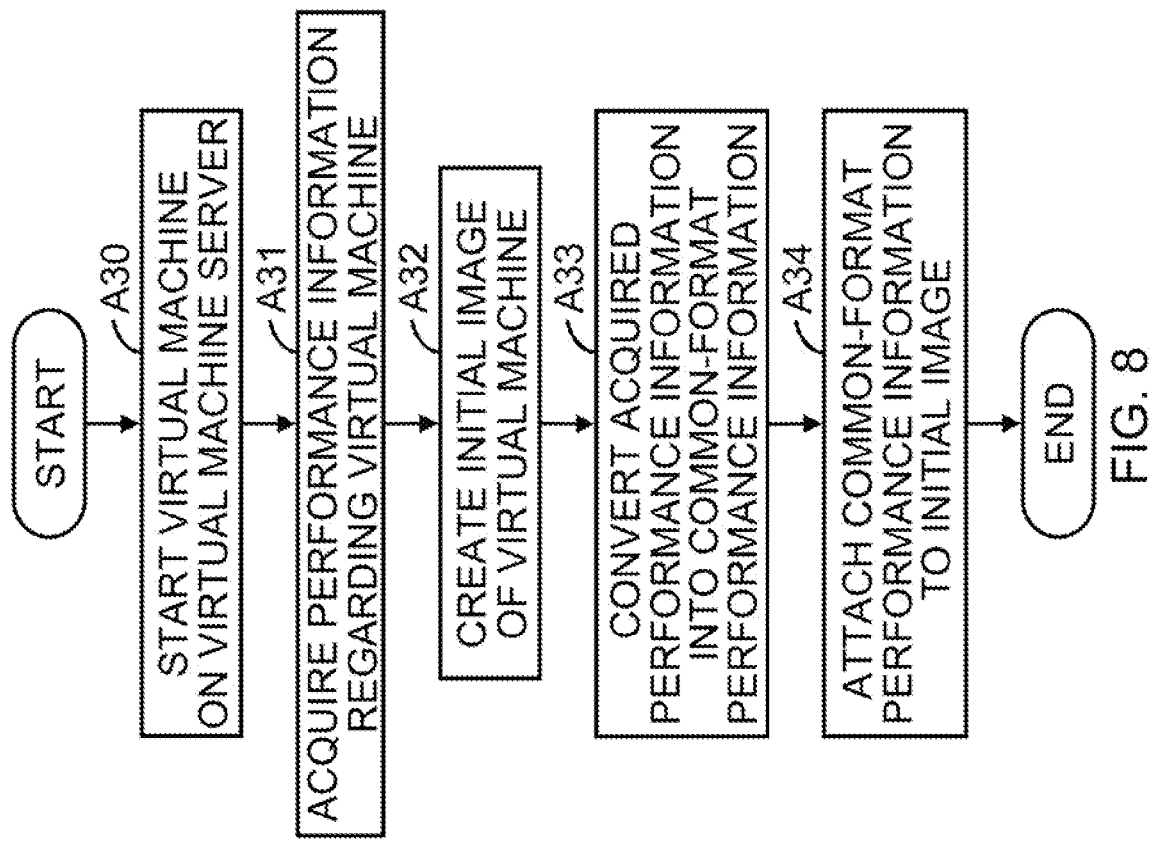
FIG. 8 is a diagram illustrating an exemplary operation flow of creating an augmented virtual machine image including common-format performance information according to an embodiment of the present invention.

FIG. 8 illustrates an exemplary operation flow of creating an augmented virtual machine image including common-format performance information according to the present embodiment. The details of A3 in FIG. 5, i.e., the operation flow of creating an augmented virtual machine image including common-format performance information will be discussed with reference to FIG. 8.

In A30, the user uploads from the user device 5 an original initial image stored in the internal or external storage device of the user device 5 into a file server (the file server 4-A in this case) included in a certain cloud system (cloud system CS_A in this case) to start a virtual machine. In addition to the uploading, the user instructs from the user device 5 the virtual machine management server 3-A to execute the uploaded original initial image so as to start the virtual machine on the virtual machine server 2-A.

In A31, for example, when the virtual machine is started on the virtual machine server 2-A, the performance information acquirer 21 acquires performance information regarding the virtual machine in response to an instruction transmitted from the virtual machine management server 3-A in accordance with an instruction from the user device 5.

In A32, for example, the image creator 23 of the virtual machine server 2-A creates an initial image of the virtual machine which runs on the virtual machine server 2-A in response to an instruction to create a virtual machine image, which has been transmitted from the user device 5 via the virtual machine management server 3-A. The image creator 23 of the virtual machine server 2-A may create an initial image of the virtual machine which runs on the virtual machine server 2-A at a predetermined time, e.g., when the virtual machine is shut down.

In A33, the performance information converter 22 reads out the performance information conversion coefficient stored in the virtual machine management server 3-A and converts the performance information acquired in A31 into the common-format performance information on the basis of the performance information conversion coefficient.

In A34, the attacher 24 attaches the common-format performance information to the attribute information of the initial virtual machine image created by the image creator 23. After that, the virtual machine image including the common-format performance information is stored in the file server 4-A.

Figure 9:
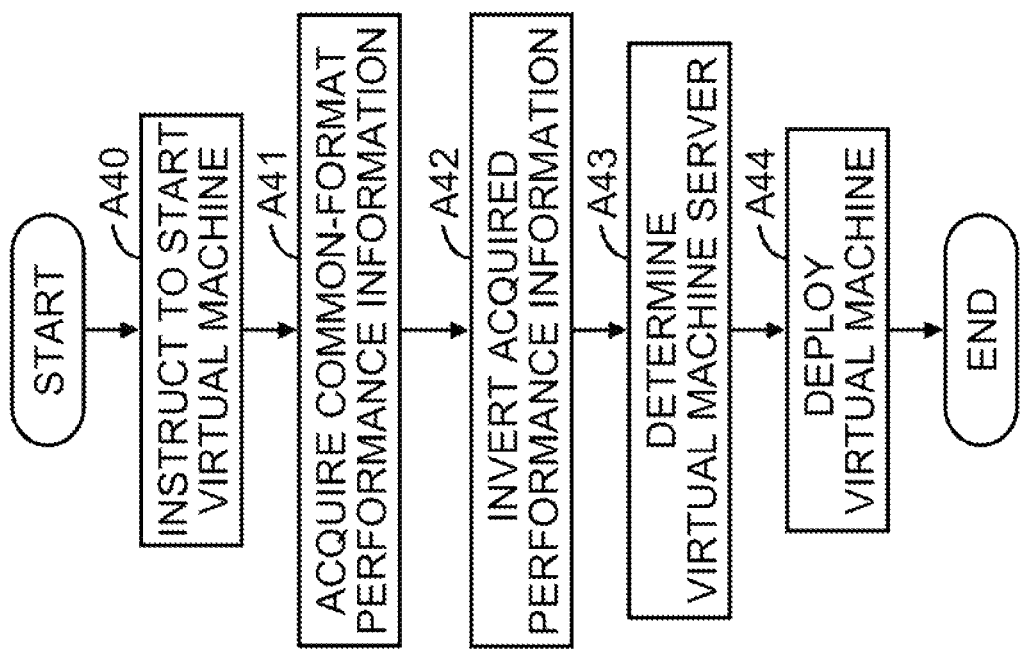
FIG. 9 is a diagram illustrating an exemplary operation flow of deploying a virtual machine across cloud systems according to an embodiment of the present invention.

FIG. 9 illustrates an exemplary operation flow of deploying a virtual machine across cloud systems according to the present embodiment. The details of A4 in FIG. 5, i.e., the operation flow of deploying the virtual machine across the cloud systems on the basis of the performance information conversion coefficient and the common-format performance information will be discussed with reference to FIG. 9.

In A40, the user acquires, by using the user device 5, the augmented virtual machine image including the common-format performance information from a file server (the file server 4-A in this case) included in a certain cloud system (cloud system CS_A in this case) and temporarily stores the augmented virtual machine image in the internal or external storage device of the user device 5. After that, the user uploads from the user device 5 the augmented virtual machine image into a file server (the file server 4-B in this case) included in another cloud system (cloud system CS_B in this case) and instructs a virtual machine management server (the virtual machine management server 3-B in this case) to execute the augmented virtual machine image so as to start a corresponding virtual machine.

In A41, the virtual machine management server 3-B acquires the common-format performance information from the augmented virtual machine image to be executed in response to the instruction from the user device.

In A42, the performance information inverter 33 inverts the common-format performance information on the basis of the performance information conversion coefficient stored in the virtual machine management server 3-B.

In A43, the virtual machine deployer 34 determines, on the basis of the inverted performance information, a virtual machine server (the virtual machine server 2-B in this case) that is suitable for the virtual machine to be deployed.

In A44, the virtual machine deployer 34 deploys the virtual machine to start the virtual machine.

Effects of the present embodiment will be discussed using a specific example of the operation flow illustrated in FIG. 9. In the example, it is supposed that a virtual machine image is transferred from the cloud system CS_A to the cloud system CS_B in the network system 10.

When the standard performance information included in the augmented standard virtual machine image is indicated by Pref, and the performance information that is acquired by executing the augmented standard virtual machine image in the cloud system CS_A is indicated by Pref(A), a performance information conversion coefficient R(A) for the cloud system CS_A is expressed by Equation (1).

$$R(A)=Pref(A)/Pref \qquad (1)$$

The performance information is the CPU utilization normalized by the CPU cycle, for example. When both of the standard performance information Pref and the performance information Pref(A) are 10%, the performance information conversion coefficient R(A) for the cloud system CS_A is 1.

In a similar manner, when the standard performance information included in the augmented standard virtual machine image is indicated by Pref, and performance information that is acquired by executing the augmented standard virtual machine image in the cloud system CS_B is indicated by Pref(B), a performance information conversion coefficient R(B) for the cloud system CS_B is expressed by Equation (2).

$$R(B)=Pref(B)/Pref \qquad (2)$$

When the performance information Pref(B) is 5%, the performance information conversion coefficient R(B) for the cloud system CS_B is 0.5.

When performance information regarding the virtual machine measured in the cloud system CS_A is indicated by Papp(A), and common-format performance information Papp that is attached to the initial virtual machine image created in the cloud system CS_A is expressed by Equation (3).

$$Papp=Papp(A)/R(A) \qquad (3)$$

When the performance information Papp(A) regarding the virtual machine measured in the cloud system CS_A is 60%, the common-format performance information is 60%. This is due to the fact that the performance information conversion coefficient R(A) is 1.

Next, inversion of the common-format performance information in A42 is performed. The inverted performance information Papp(B) is expressed by Equation (4).

$$Papp(B)=Papp \times R(B) \qquad (4)$$

Since the common-format performance information Papp is 60% and the performance information conversion coefficient R(B) for the cloud system CS_B is 0.5, the inverted performance information Papp(B) is 30%.

It is apparent that if the CPU utilization of each of virtual machines is 30%, the CPU utilization of two virtual machines is required in the cloud system CS_A and the CPU utilization of one virtual machine is required in the cloud system CS_B.

When the conversion of performance information into common-format performance information and the inversion are not performed, it is considered that a virtual machine is deployed in the cloud system CS_B using the performance information Papp(A) (=60%) of the virtual machine measured in the cloud system CS_A.

In the network system 10 according to the present embodiment, however, since the conversion of performance information into common-format performance information and the inversion are performed, the virtual machine may be deployed in the cloud system CS_B using the performance information Papp(B) (=30%). Thus, deployment of the virtual machine based on recognition of unnecessarily high CPU utilization may not be performed. That is, the virtual machine may be deployed on the basis of the reliable information. Therefore, the virtual machine may be appropriately deployed across the cloud systems.

In the network system 10 according to the present embodiment, when deploying a virtual machine image across the different cloud systems, the virtual machine may be efficiently deployed by inverting the converted common-format performance information.

In the network system 10 according to the present embodiment, the performance information is converted into the common-format performance information. The common-format performance information is attached to the virtual machine image. The common-format performance information is inverted in each of the cloud systems. Thus, information necessary for the deployment of the virtual machine may be transferred between the different cloud systems.

Since it is possible to efficiently deploy the virtual machine using the reliable information, performance expected by the user may be achieved even when the virtual machine image is migrated.

Since the virtual machine image may be migrated between the cloud systems while the performance expected by the user is achieved, the user may select a desired cloud system while satisfying the availability of the virtual machine.

Second Embodiment

Figure 10:
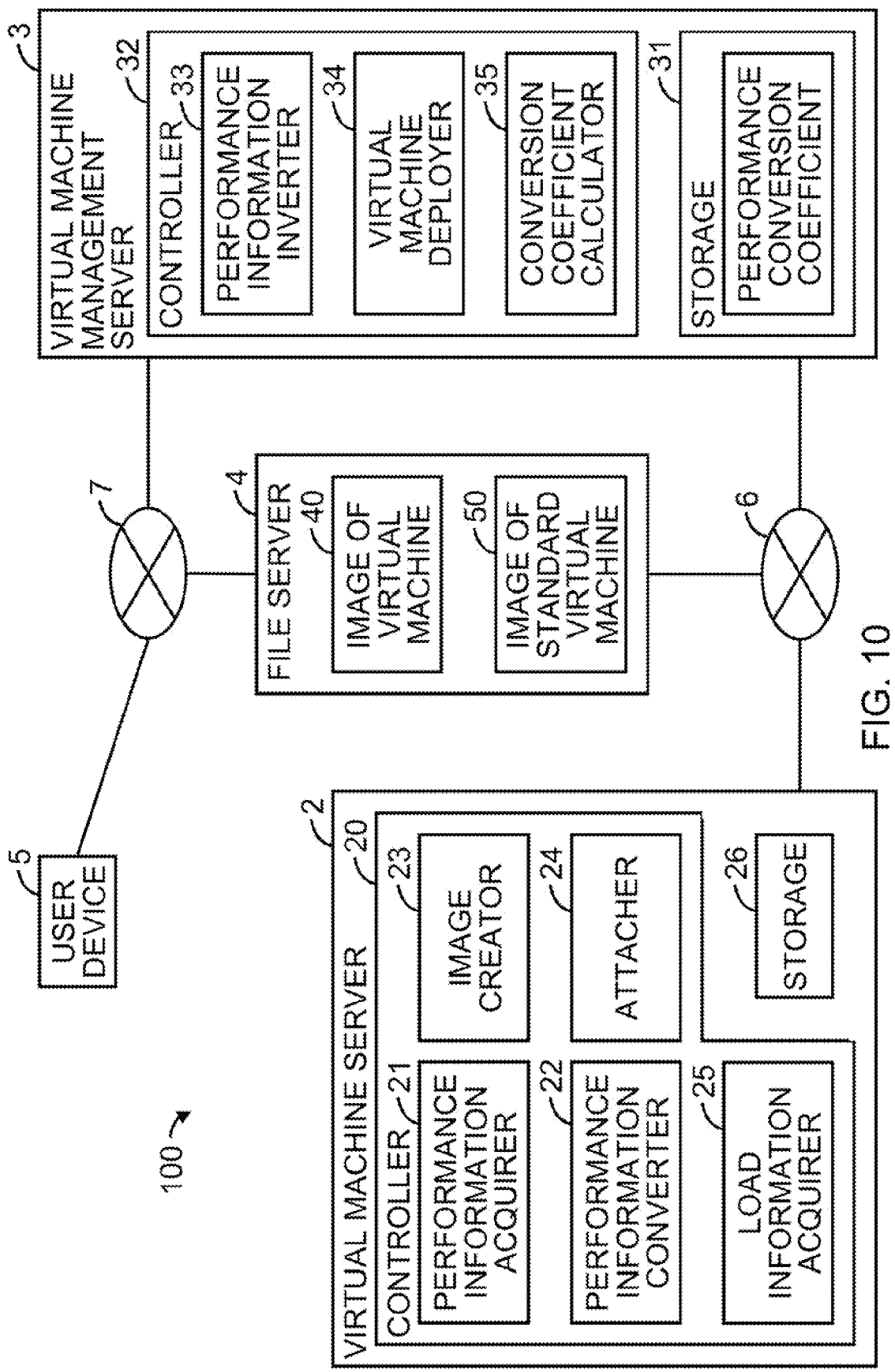
FIG. 10 is a diagram illustrating an exemplary configuration of a system according to an embodiment of the present invention.

FIG. 10 illustrates an exemplary configuration of a system according to a second embodiment. A system 100 has the same configuration as the system 1 discussed above except that the virtual machine server 2 of the system 100 has a load information acquirer 25. Reference numerals similar to those in FIG. 1 indicate parts similar to those in FIG. 1, respectively, and a discussion of the parts is omitted.

In the virtual machine server 2, the controller 20 that is the CPU included in the physical machine achieves a function of the load information acquirer 25 by executing at least one of the application programs and the like stored in the storage 26, for example.

The load information acquirer 25 acquires, in response to an instruction that has been transmitted from the virtual machine management server 3 on the basis of an instruction from the user device 5, load information regarding the virtual machine running on the virtual machine server 2, for example. The load information is information regarding the number of requests provided to the virtual machine, for example. The load information may be the average or peak value of the information per unit time, or may be a periodical change in the information for each day or month as long as the load information is used to deploy the virtual machine.

The load information acquirer 25 acquires the load information by executing the OS (guest OS) of the virtual machine, for example. The load information acquirer 25 may acquire the load information regarding the virtual machine running on the virtual machine server 2 by starting the virtual machine.

In the present embodiment, the attacher 24 attaches the common-format performance information generated by the performance information converter 22 and the load information acquired by the load information acquirer 25 to the virtual machine image created by the image creator 23. Specifically, the attacher 24 attaches the common-format performance information and the load information in the attribute information of the virtual machine image.

The virtual machine deployer 34 deploys the virtual machine image stored in the file server 4 on the virtual machine server 2 on the basis of one or more pieces of performance information inverted by the performance information inverter 33 and the load information included in the virtual machine image.

Figures 11A, 11B:
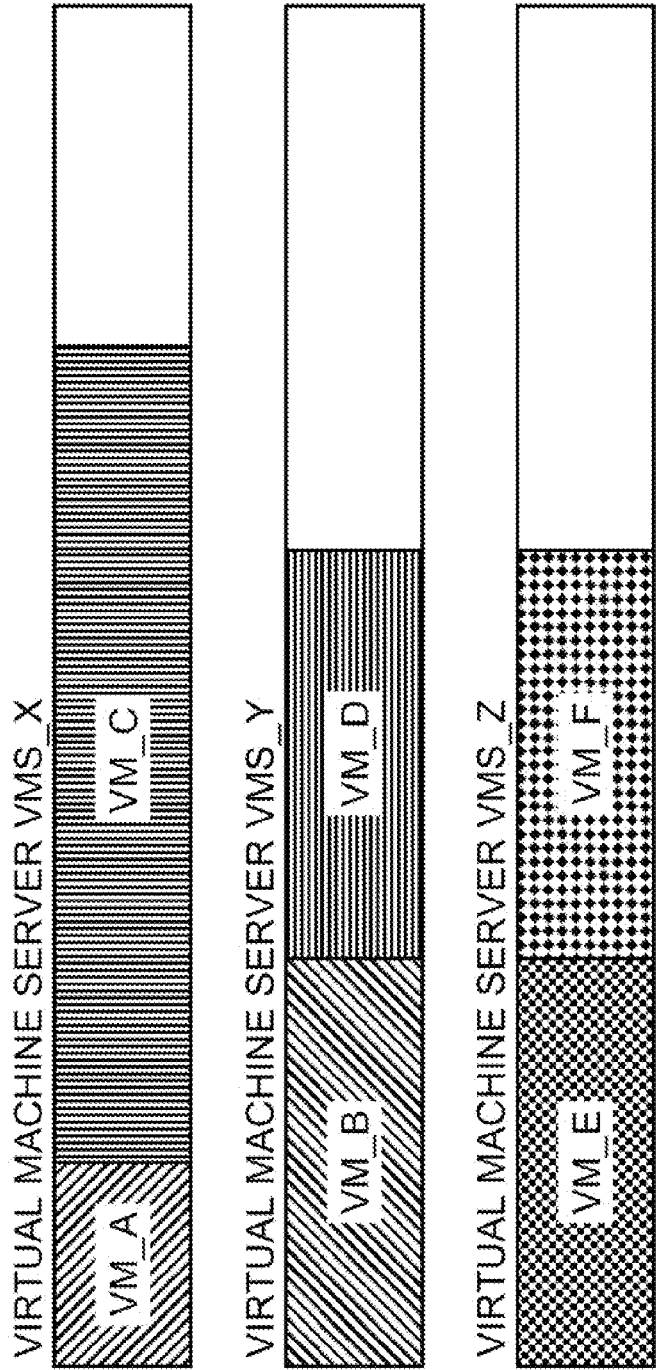
FIG. 11A is a diagram illustrating an example of performance information regarding virtual machines according to an embodiment of the present invention.
FIG. 11B is a diagram illustrating an exemplary deployment of virtual machines on virtual machine servers according to an embodiment of the present invention.

FIG. 11A illustrates an example of performance information regarding virtual machines. FIG. 11B illustrates an exemplary deployment of virtual machines on virtual machine servers. An example of operations of the virtual machine deployer 34 according to the present embodiment will be discussed with reference to FIGS. 11A and 11B. FIGS. 11A and 11B illustrates a system that includes six virtual machines VM_A, VM_B, VM_C, VM_D, VM_E and VM_F and three virtual machine servers VMS_X, VMS_Y and VMS_Z. As illustrated in FIG. 11A, the CPU utilization normalized by the CPU cycle is provided for each of the virtual machines VM_A to VM_F as the performance information inverted by the performance information inverter 33. In the example illustrated in FIG. 11A, the CPU utilization normalized by the CPU cycle of the virtual machines VM_A to VM_D are 15%, 30%, 60%, 30%, 30% and 30%, respectively. In addition, a high loaded time period is provided to each of the virtual machines VM_A to VM_F as the load information. In the example illustrated in FIG. 11A, the high loaded time periods of the virtual machines VM_A to VM_F are "constant", "morning", "constant", "night", "morning" and "night", respectively.

Figure 12:
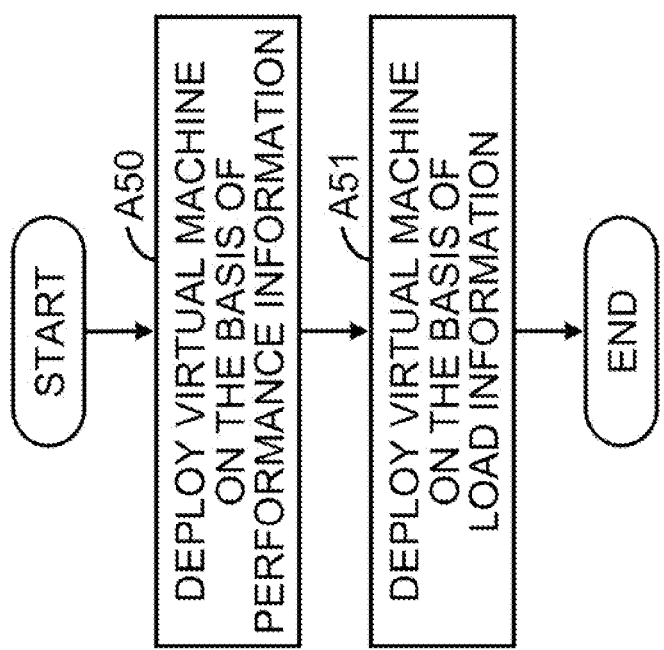
FIG. 12 is a diagram illustrating an exemplary operation flow of deploying virtual machines across cloud systems according to an embodiment of the present invention.

FIG. 12 illustrates an exemplary operation flow of deploying virtual machines according to the present embodiment.

An example in which the virtual machines are deployed on the virtual machine servers VMS_X to VMS_Z so that the CPU utilization of each virtual machine server does not exceed 80% will be discussed below.

In A50, the virtual machine deployer 34 of the virtual machine management server 3 determines, on the basis of the inverted performance information, to cause virtual machines VM_A and VM_C to run on the same virtual machine server (for example, virtual machine server VMS_X). The detailed operation flow of A50 is similar to that of aforementioned A4 in FIG. 5.

In A51, the CPU utilization of each of the rest of virtual machines is 30%, and how to deploy the rest of virtual machines may not be uniquely determined. Thus, the virtual machine deployer 34 determines deployment of the rest of virtual machines on the basis of the load information.

In this case, for example, in order to make loads of the virtual machine servers to be equal, the virtual machine deployer 34 deploys the virtual machines VM_B and VM_D on the virtual machine server VMS_Y and deploys the virtual machines VM_E and VM_F on the virtual machine server VMS_Z.

Figure 13:
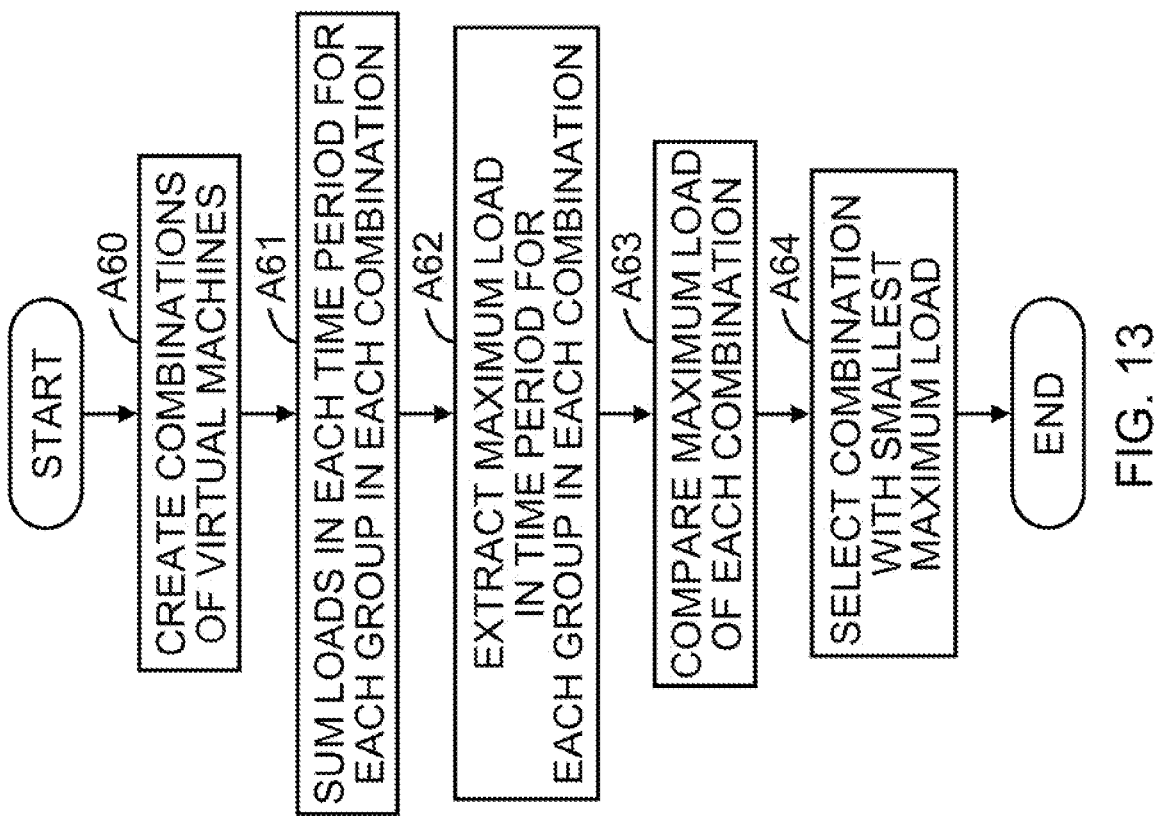
FIG. 13 is a diagram illustrating an exemplary operation flow of deploying virtual machines across cloud systems according to an embodiment of the present invention.

FIG. 13 illustrates an exemplary operation flow of deploying virtual machines across cloud systems according to the present embodiment. FIG. 14 illustrates an example of load information according to the present embodiment. In the example illustrated in FIG. 14, the number of times of access in each time period to a service provided by each of the virtual machines is provided as the load information regarding the each of the virtual machines. For example, the virtual machines VM_A and VM_B are accessed many times in daytime and the virtual machines VM_C and VM_D are accessed many times in time periods from night to dawn. The details of A51 in FIG. 12, i.e., the operation flow of deploying the virtual machines on the basis of the load information will be discussed with reference to a FIGS. 13 and 14.

In A60, the virtual machine deployer 34 according to the present embodiment creates combinations of virtual machines. For example, the virtual machine deployer 34 creates a combination of the virtual machines VM_A and VM_B and the virtual machines VM_C and VM_D, a combination of the virtual machines VM_A and VM_C and the virtual machines VM_B and VM_D, and a combination of the virtual machines VM_A and VM_D and the virtual machines VM_B and VM_C.

In A61, the virtual machine deployer 34 sums loads of virtual machines in each time period illustrated in FIG. 14 for each of the combinations created in A60.

In A62, and extracts the maximum load in a time period for each group in each combination of the virtual machines.

Specifically, the total load of the group of the virtual machines VM_A and VM_B is the maximum in a time period from 10 o'clock to 12 o'clock. The maximum load L(A,B) of the group of the virtual machines VM_A and VM_B is calculated as L(A,B)=90+150=240. The maximum load L(C,D) of the group of the virtual machines VM_C and VM_D is calculated as L(C,D)=135+70=205. The maximum load L(A,C) of the group of the virtual machines VM_A and VM_C is calculated as L(A,C)=1+135=136. The maximum load L(B,D) of the group of the virtual machines VM_B and VM_D is calculated as L(B,D)=150+2=152. The maximum load L(A,D) of the group of the virtual machines VM_A and VM_D is calculated as L(A,D)=80+30=110. The maximum load L(B,C) of the group of the virtual machines VM_B and VM_C is calculated as L(B,C)=150+3=153.

In A63, the virtual machine deployer 34 compares the maximum loads of the combinations.

In A64, the virtual machine deployer 34 selects a combination which has a smallest maximum load to deploy the virtual machines on the virtual machine servers on the basis of the selected combination.

Specifically, the maximum load of the combination of the virtual machines VM_A and VM_B and the virtual machines VM_C and VM_D is 240. The maximum load of the combination of the virtual machines VM_A and VM_C and the virtual machines VM_B and VM_D is 152. The maximum load of the combination of the virtual machines VM_A and VM_D and the virtual machines VM_B and VM_C is 153.

Thus, the virtual machine deployer 34 selects the combination of the virtual machines VM_A and VM_C and the virtual machines VM_B and VM_D, since the maximum load of the combination is smallest. Then, the virtual machine deployer 34 deploys the virtual machines on the virtual machine servers on the basis of the selected combination.

The system 100 according to the present embodiment provides similar effects as that of the first embodiment. In the system 100 according to the present embodiment, the virtual machines are deployed on the basis of the performance information and the load information. It is, therefore, possible to deploy the virtual machines more efficiently.

Other Embodiments

The technique discussed above is not limited to the aforementioned embodiments and may be variously modified without departing from the gist of the embodiments.

For example, in the first embodiment, the performance information converter 22 is included in the virtual machine server 2. However, the configuration is not limited to this. For example, the virtual machine management server 3 may include the performance information converter 22. In this case, the virtual machine management server 3 acquires the performance information acquired by the performance information acquirer 21 and generates the common-format performance information on the basis of the performance information conversion coefficient stored in the virtual machine management server 3, for example.

In the first embodiment, the image creator 23 is included in the virtual machine server 2. However, the configuration is not limited to this. For example, the virtual machine management server 3 may include the image creator 23.

In the first embodiment, the attacher 24 is included in the virtual machine server 2. However, the configuration is not limited to this. For example, the virtual machine management server 3 may include the attacher 24. In this case, the attacher 24 acquires the common-format performance information generated by the performance information converter 22 and attaches the common-format performance information to the virtual machine image.

In the first embodiment, the conversion coefficient calculator 35 is included in the virtual machine management server 3. However, the configuration is not limited to this. For example, the virtual machine server 2 may include the conversion coefficient calculator 35. In this case, the performance information conversion coefficient that is calculated by the conversion coefficient calculator 35 is stored in the storage 31 of the virtual machine management server 3.

In the first embodiment, the cloud system CS_A includes two virtual machine servers 2-A. However, the configuration is not limited to this. The cloud system CS_A may include one virtual machine server 2-A or include three or more virtual machine servers 2-A.

In the first embodiment, the cloud system CS_B includes two virtual machine servers 2-B. However, the configuration is not limited to this. The cloud system CS_B may include one virtual machine server 2-B or include three or more virtual machine servers 2-B.

In the first embodiment, the systems 1 and 100 each have one virtual machine server 2. However, the configuration is not limited to this. The systems 1 and 100 may each include two or more virtual machine servers.

In the first embodiment, the network system includes two cloud systems CS_A and CS_B. However, the configuration is not limited to this. The network system may include three or more cloud systems.

Figure 15:
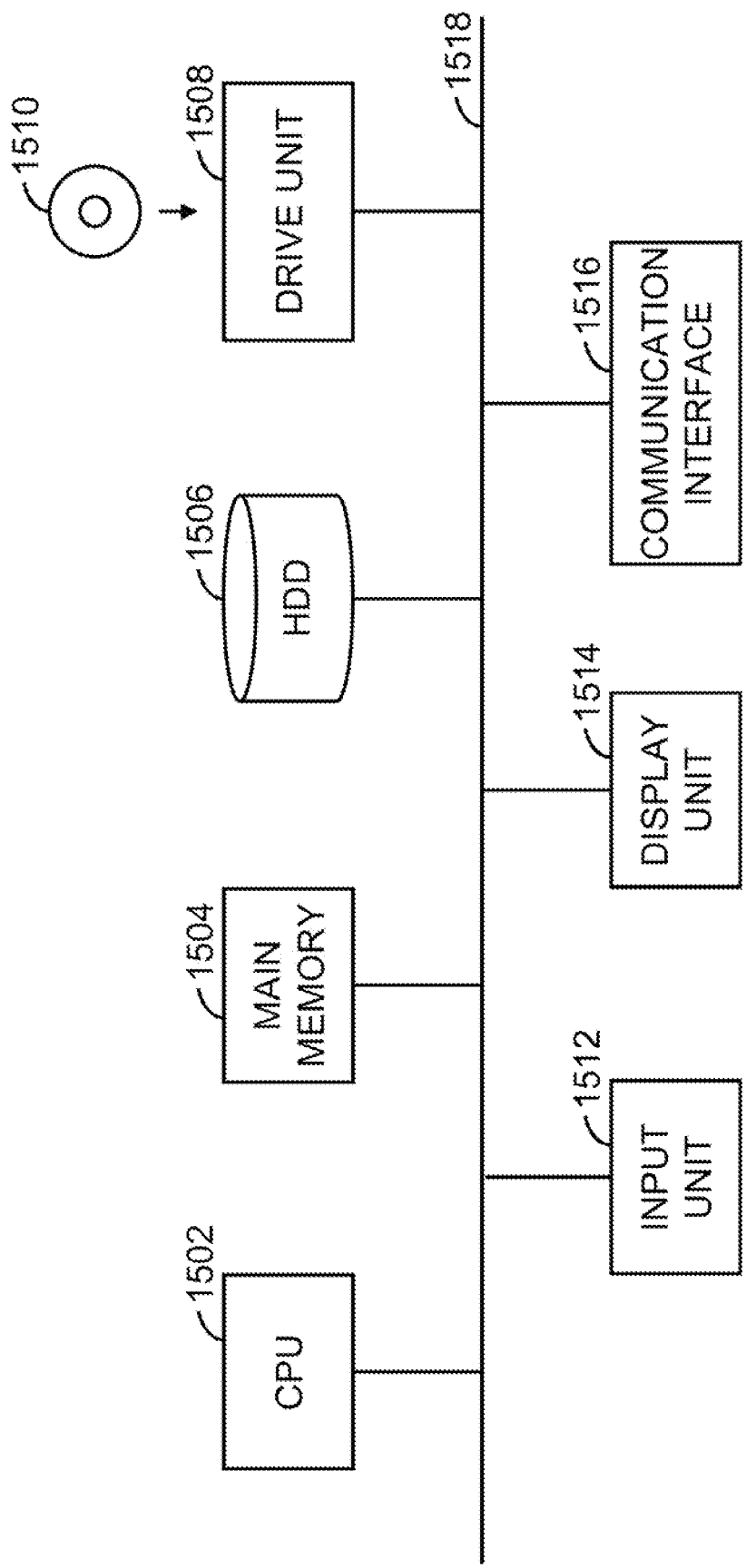
FIG. 15 is a diagram illustrating an exemplary system configuration of a computer.

The functions of the virtual machine server, the virtual machine management server, or the file server may be realized by a computer by executing software. FIG. 15 illustrates an exemplary system configuration of a computer. The computer illustrated in FIG. 15 includes a CPU 1502 for executing the software such as OS and application programs, a main memory 1504 such as an RAM for temporarily storing data, an auxiliary storage such as an HDD 1506 for storing data, a drive unit 1508 for reading data from and/or writing data to a removable disk 1510, an input unit 1512 for accepting user input, a display unit 1514 for displaying data, and a communication interface 1516 for establishing a connection to a network. These components are connected to each other via a bus 1518. The software may be stored in the removable disk 1510 when delivered, installed onto the HDD 1506 from the removable disk 1510, and loaded into the main memory 1504 from the HDD 1506 when executed by the CPU 1502. The software may be delivered over the network.

Various application programs that achieve the functions of the CPUs included in the virtual machine server 2, the virtual machine management server 3 and the file server 4 are stored in the removable disk 1510. The removable disk 1510 is a computer-readable storage medium such as a flexible disk, a compact disc (CD), a CD-ROM, a CD recordable (CD-R), a CD rewritable (CD-RW) or the like, a digital versatile disc (DVD), a DVD-ROM, a DVD-RAM, a DVD recordable (DVD-R), a DVD+R, a DVD rewritable (DVD-RW), a DVD+

RW, a high-definition DVD (HD DVD), or the like, a Blu-ray disc, a magnetic disk, an optical disc or a magneto-optical disk. The computer reads the programs from the storage medium, and stores the read programs in the internal or external storage device so that the programs may be used. The programs may be stored in a storage device (storage medium) such as a magnetic disk, an optical disc or a magneto-optical disk and provided from the storage device to the computer through a communication path.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been discussed in detail, it should be understood that the various changes, substitutions, and alterations could be made hereto without departing from the spirit and scope of the invention.

What is claimed is:

1. A network system comprising:
 a plurality of cloud systems, each of the plurality of cloud systems including a plurality of servers, each of the plurality of servers allowing virtual machines to run thereon, wherein a first cloud system of the plurality of cloud systems includes:
  a first generator configured to generate, on the basis of first performance information regarding one virtual machine and a first predetermined coefficient predetermined for the first cloud system, second performance information regarding the one virtual machine, the first performance information being included in a first augmented image of the one virtual machine, the first augmented image being created in a second cloud system other than the first cloud system, the second cloud system being included in the plurality of cloud systems, and
  a deployer configured to deploy the one virtual machine on one of the plurality of servers included in the first cloud system on the basis of the generated second performance information, wherein
 the second cloud system includes:
  a first acquirer configured to acquire third performance information regarding the one virtual machine in the second cloud system,
  a second generator configured to generate the first performance information by converting the acquired third performance information on the basis of a second coefficient predetermined for the second cloud system,
  an image creator configured to create an initial image of the one virtual machine, and
  an attacher configured to attach the generated first performance information to the created initial image to create the first augmented image.

2. The network system according to claim 1, wherein the first generator multiplies the first performance information by the first predetermined coefficient to generate the second performance information.

3. The network system according to claim 1, wherein the second generator divides the acquired third performance information by the second predetermined coefficient to generate the first performance information.

4. The network system according to claim 1, wherein the first cloud system further includes:
  a second acquirer configured to acquire first standard performance information regarding a standard virtual machine, and
  a first calculator configured to calculate the first predetermined coefficient on the basis of the acquired first standard performance information and second standard performance information included in a standard augmented image of the standard virtual machine.

5. The network system according to claim 4, wherein the first acquirer acquires a third standard performance information regarding the standard virtual machine, and the second cloud system further includes:
  a second calculator configured to calculate the second predetermined coefficient on the basis of the acquired third standard performance information and the second standard performance information included in the standard augmented image.

6. The network system according to claim 5, wherein the second calculator divides the acquired third standard performance information by the second standard performance information to calculate the second predetermined coefficient.

7. The network system according to claim 4, wherein the first calculator divides the acquired first standard performance information by the second standard performance information to calculate the first predetermined coefficient.

8. The network system according to claim 4, wherein the second standard performance information included in the standard augmented image is acquired by any acquirer for acquiring performance information regarding a virtual machine, the any acquirer being included in one of the plurality of cloud systems.

9. A management server included in a first cloud system in a network system including a plurality of cloud systems, each of the plurality of cloud systems including a plurality of servers, each of the plurality of servers allowing virtual machines to run thereon, the management server comprising:
  a generator configured to generate, on the basis of first performance information regarding one virtual machine and a predetermined coefficient predetermined for the first cloud system, second performance information regarding the one virtual machine, the first performance information being included in a first augmented image of the one virtual machine, the first augmented image being created in a second cloud system other than the first cloud system, the second cloud system being included in the plurality of cloud systems; and
  a deployer configured to deploy the one virtual machine on one of the plurality of servers included in the first cloud system on the basis of the generated second performance information, wherein
 the second cloud system includes:
  a first acquirer configured to acquire third performance information regarding the one virtual machine in the second cloud system,
  a second generator configured to generate the first performance information by converting the acquired third performance information on the basis of a second coefficient predetermined for the second cloud system,
  an image creator configured to create an initial image of the one virtual machine, and an attacher configured to attach the generated first performance information to the created initial image to create the first augmented image.

10. The management server according to claim 9, wherein the generator multiplies the first performance information by the predetermined coefficient to generate the second performance information.

11. A virtual machine deployment method executed by a network system including a plurality of cloud systems, each of the plurality of cloud systems including a plurality of servers, each of the plurality of servers allowing virtual machines to run thereon, the virtual machine deployment method comprising:
generating, on the basis of first performance information regarding one virtual machine and a first predetermined coefficient predetermined for a first cloud system, second performance information regarding the one virtual machine by the first cloud system, the first performance information being included in a first augmented image of the one virtual machine, the first augmented image being created by a second cloud system other than the first cloud system, the second cloud system being included in the plurality of cloud systems;
deploying, by the first cloud system, the one virtual machine on one of the plurality of servers included in the first cloud system on the basis of the generated second performance information;
acquiring, by the second cloud system, third performance information regarding the one virtual machine;
generating, by the second cloud system, the first performance information by converting the acquired third performance information on the basis of a second predetermined coefficient predetermined for the second cloud system;
creating, by the second cloud system, an initial image of the one virtual machine; and
attaching, by the second cloud system, the generated first performance information to the created initial image to create the first augmented image.

12. The virtual machine deployment method according to claim 11, wherein
the first cloud system multiplies the first performance information by the first predetermined coefficient to generate the second performance information.

13. The virtual machine deployment method according to claim 11, wherein
the second cloud system divides the acquired third performance information by the second predetermined coefficient to generate the first performance information.

14. The virtual machine deployment method according to claim 11, further comprising:
acquiring, by the first cloud system, first standard performance information regarding a standard virtual machine; and
calculating, by the first cloud system, the first predetermined coefficient on the basis of the acquired first standard performance information and second standard performance information included in a standard augmented image of the standard virtual machine.

15. The virtual machine deployment method according to claim 14, further comprising:
acquiring, by the second cloud system, a third standard performance information regarding the standard virtual machine; and
calculating, by the second cloud system, the second predetermined coefficient on the basis of the acquired third standard performance information and the second standard performance information included in the standard augmented image.

16. The virtual machine deployment method according to claim 14, wherein
the second cloud system divides the acquired first standard performance information by the second standard performance information to calculate the first predetermined coefficient.

17. The virtual machine deployment method according to claim 15, wherein
the second cloud system divides the acquired third standard performance information by the second standard performance information to calculate the second predetermined coefficient.

18. A computer-readable, non-transitory medium storing a program that causes a computer to execute a virtual machine deployment method, the computer being included in a first cloud system of a plurality of cloud systems, each of the plurality of cloud systems including a plurality of servers, each of the plurality of servers allowing virtual machines to run thereon, the virtual machine deployment method comprising:
generating, on the basis of first performance information regarding one virtual machine and a first predetermined coefficient predetermined for the first cloud system, second performance information regarding the one virtual machine, the first performance information being included in a first augmented image of the one virtual machine, the first augmented image being created by a second cloud system other than the first cloud system, the second cloud system being included in the plurality of cloud systems;
deploying the one virtual machine on one of the plurality of servers included in the first cloud system on the basis of the generated second performance information;
acquiring, by the second cloud system, third performance information regarding the one virtual machine;
generating, by the second cloud system, the first performance information by converting the acquired third performance information on the basis of a second predetermined coefficient predetermined for the second cloud system;
creating, by the second cloud system, an initial image of the one virtual machine; and
attaching, by the second cloud system, the generated first performance information to the created initial image to create the first augmented image.

* * * * *